(12) United States Patent
Crabtree

(10) Patent No.: US 8,701,598 B1
(45) Date of Patent: Apr. 22, 2014

(54) HOLLOW BONE AND CHEW PIECE CARRIER WITH NON-CONTACT ZONE AND CHEWING AND TREAT SPACE FOR DOGS AND OTHER ANIMALS

(76) Inventor: Ann Crabtree, Denver, CO (US)

( * ) Notice: Subject to any disclaimer, the term of this patent is extended or adjusted under 35 U.S.C. 154(b) by 0 days.

(21) Appl. No.: 13/066,603

(22) Filed: Apr. 18, 2011

Related U.S. Application Data

(60) Provisional application No. 61/331,743, filed on May 5, 2010.

(51) Int. Cl.
  *A01K 29/00* (2006.01)
(52) U.S. Cl.
  USPC .......................................... 119/710; 119/709
(58) Field of Classification Search
  USPC .......... 119/702, 707, 709, 710, 711; 446/419, 446/318, 409, 418, 489; 482/50, 106, 108
  See application file for complete search history.

(56) References Cited

U.S. PATENT DOCUMENTS

| | | | | |
|---|---|---|---|---|
| 764,118 | A | * | 7/1904 | Duffner .......................... 482/110 |
| 980,025 | A | * | 12/1910 | Titus .............................. 482/108 |
| D346,048 | S | * | 4/1994 | Jandebeur et al. ............ D30/160 |
| D412,606 | S | * | 8/1999 | Weinacker, Jr. ............... D30/160 |
| 5,967,952 | A | * | 10/1999 | Bronstein et al. ............. 482/111 |
| 6,050,224 | A | * | 4/2000 | Owens ........................... 119/710 |
| 6,112,703 | A | | 9/2000 | Handelsman |
| 6,202,598 | B1 | | 3/2001 | Willinger |
| 6,981,471 | B1 | | 1/2006 | Dubinins et al. |
| 7,694,653 | B2 | | 4/2010 | Axelrod |
| D620,207 | S | * | 7/2010 | Byrne .......................... D30/160 |
| 7,810,455 | B2 | | 10/2010 | Axelrod et al. |
| 2002/0198476 | A1 | * | 12/2002 | Chen ............................... 601/84 |
| 2004/0134446 | A1 | * | 7/2004 | Keller ............................ 119/707 |
| 2006/0243219 | A1 | * | 11/2006 | Brown ........................... 119/710 |
| 2007/0135275 | A1 | * | 6/2007 | Oates ............................ 482/109 |
| 2009/0078214 | A1 | | 3/2009 | Mann |

* cited by examiner

*Primary Examiner* — Rob Swiatek
*Assistant Examiner* — Lisa Tsang
(74) *Attorney, Agent, or Firm* — Edwin H. Crabtree; Ramon L. Pizarro

(57) ABSTRACT

A dog bone carrier adapted for receiving and holding various sizes of hollow dog bones, that allows for chewing satisfaction for the animal, while protecting household surfaces for the owner. The carrier includes an elongated shaft having opposite ends attached to first and second end piece balls. The shaft has a length greater than the length of the dog bone for providing a chewing space. A chewing space allows the dog to engage the side of one end of the bone with his or her mouth and also allows space for additional chews. The diameter of the shaft is less than an interior diameter of the hollow bone to allow the dog bone to slide back and forth on the shaft. This difference in diameters forms a treat space. The diameter of the first and second balls is greater than an exterior diameter or width of the dog bone. This difference in the diameter of the end piece balls and the exterior diameter of the dog bone provides for a non-contact zone to prevent the exterior of the dog bone from engaging and scratching a surface, when the carrier is dropped and rolled thereon.

5 Claims, 2 Drawing Sheets

HOLLOW BONE AND CHEW PIECE CARRIER WITH NON-CONTACT ZONE AND CHEWING AND TREAT SPACE FOR DOGS AND OTHER ANIMALS

This non-provisional patent application claims the benefit of an earlier filing date of a provisional patent application filed on May 5, 2010, Ser. No. 61/331,743, by the subject inventor, and having a title of "ASSEMBLY AND METHOD FOR HOUSING A CHEW PIECE".

BACKGROUND OF THE INVENTION (a) Field of the Invention

This invention relates to animal chewing devices and more particularly, but not by way of limitation, to a carrier for hollow dog bone or toy with non-contact zone for protecting different types of surfaces when the carrier is dropped or moved on surfaces such as a floor, a rug, a piece of furniture or outdoors on the ground and a dog is chewing on or playing with a dog bone or chew piece mounted on the carrier. Embodiments of the present invention allow a pet to enjoy a chewable piece while at the same time protecting floors and other surfaces.

(b) Discussion of Prior Art

Certain dogs of different sizes and ages enjoy chewing on dog bones, such as a natural cow bone, an artificial bone, a chew piece, and the like. Such items, when dropped or played with by a dog, scratch, mar or dirty a floor surface, a rug or a piece of furniture to the displeasure of the pet owner. The subject invention is designed to greatly reduce this problem and protect various types of surfaces.

Heretofore, there have been a number of different types of patented pet chew and pet toys for chewing and playing by pet dogs and other animals. In U.S. Pat. No. 6,112,703 to Handelsman, U.S. Pat. No. 6,202,598 to Willinger, U.S. Pat. No. 6,981,471 to Dubinins et al., U.S. Pat. No. 7,810,455 to Axelrod et al, U.S. Pat. No. 7,694,653 to Axelrod and Patent Application 2009/0078214 to Mann, various types of pet toys and animal chews are disclosed for the enjoyment of dogs and other animals. None of these prior art referenced particularly disclose the unique structure and function of the subject invention with the advantages and objects as discussed herein.

SUMMARY OF THE INVENTION

A variety of chew toys are available for the entertainment of pets. Many chews or bones, especially those marketed for heavier chewers, are often harder in structure and heavier in weight. Such chews can be natural cow bones, or items manufactured in various configurations. Pets typically chew on the ends of these products. The pet will frequently drop the chew toy when done with play or as part of play, causing the toy to hit or move across floors or other surfaces. This activity can damage the surfaces, particularly those made of wood and tile. Furthermore, regardless of the size or configuration of the chew toy, the owner may wish to protect household surfaces from making contact with pet saliva. With outdoor use, pet chews/bones come in contact with dirt and other debris.

Accordingly, a need exists for a carrier for pet chew toys, to minimize the contact chew toys make with household/outdoor surfaces, while allowing the pet to maximize chewing enjoyment. The carrier, when combined with a chew toy, provides entertainment for the pet, while protecting surfaces for the owner.

In view of the foregoing, it is a primary objective of the subject invention to provide a dog bone carrier having a non-contact zone that protects various types of surfaces when the carrier is dropped or when a dog chews on or plays with a dog bone.

Another key object of the invention is the dog bone carrier allows different sizes of hollow dog bones or chew pieces to be carried thereon and provides a chewing space for the dog's mouth to chew on a side of one end of the hollow bone and/or lick a dog treat placed in the treat space next to or inside an interior of the bone.

A further object of the dog bone carrier is the chewing space provides an elongated shaft between the two end piece balls, which allows the hollow dog bone and the like to slide from one end of the shaft to an opposite end of the shaft for the entertainment of the dog.

Yet another object invention is with the chewing space created between one of the balls and an end of the dog bone, a dog treat space is created between the interior diameter of the dog bone and the diameter of the shaft for inserting a dog treat therein.

Still another object of the dog bone carrier is the use of at least two end balls, which are made of flexible material, for example, having a Shore A durometer in a range of 30 to 95, to prevent harming the floor surface when the carrier is dropped or rolled thereon.

Yet another object of the invention is the ability to enhance pet interest by varying the distance between the chew piece and the end pieces, and the carrier can be adjusted to accommodate different size dog bones and chew pieces. The dog bones can be made from natural cow bones, or made as artificial bones, chew pieces, and the like. Also, the carrier can be made in different sizes for small, medium and large dogs.

The carrier includes at least one elongated shaft. The shaft can be formed as a separate piece or as an integral part of one or both end pieces. The shaft has a length which is greater than the length of the dog bone which provides for a chewing space. Also, the shaft can be adjustable in length for receiving different lengths of dog bones and allowing the bones to slide thereon. The chewing space allows the dog to engage the side of one end of the bone with his or her mouth. The pet owner can adjust the carrier and number of chew treats to maximize pet entertainment while protecting surfaces.

The shaft includes a first end portion received in a press fit in a first hole in a first flexible end piece ball. Other coupling arrangements not specifically discussed may include but are not limited to hooks, clevis pins, clips, expansion wedges and the like. Also, the shaft includes a second end portion received in a press fit in a second hole in a second flexible end piece ball. The diameter of the shaft is less than an interior diameter of the hollow bone. This difference in diameters allows the dog bone to slide back and forth on the shaft for creating the chewing space and also creates a treat space. This provides added entertainment for the dog and allows chewing on both ends of the bone.

The diameter of the first and second balls is greater than the exterior diameter or width of the dog bone. This difference in the diameter of the end piece balls and the exterior diameter or overall width of the dog bone provides for a non-contact zone therearound to prevent the dog bone from engaging, scratching or getting dirt on a surface, when the carrier is dropped and rolled thereon. This non-contact zone also minimizes the transfer of pet saliva to surfaces. In addition, the non-contact zone prevents the dog bone from contacting a ground surface and gathering dirt and debris, when the carrier is dropped outside.

These and other objects of the present invention will become apparent to those familiar with various types of pet chew and pet toy products when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the subject dog bone carrier, and in which.

DESCRIPTION OF THE PREFERRED EMBODIMENTS

Figure 1:
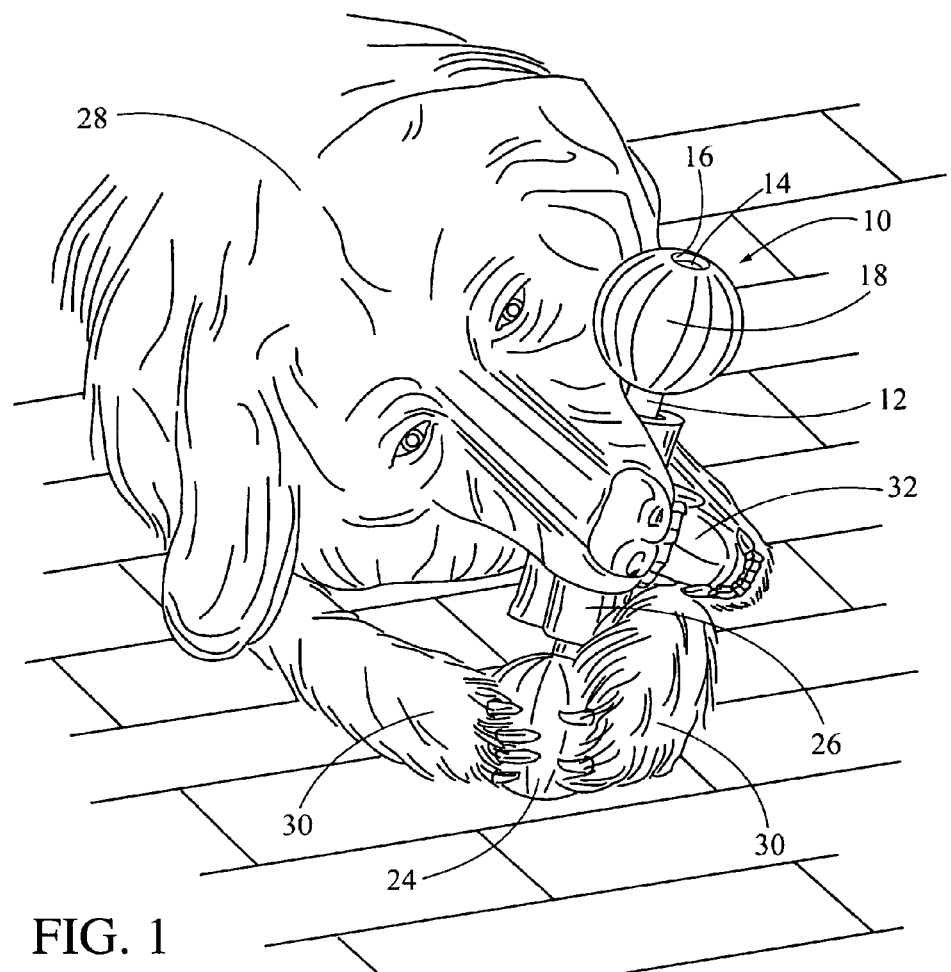
FIG. 1 illustrates a perspective view of the subject dog bone carrier showing a dog engaging an end piece ball with his or her paws with the dog's mouth chewing on the side of one end of a dog bone held on the bone carrier.
Figure 2:
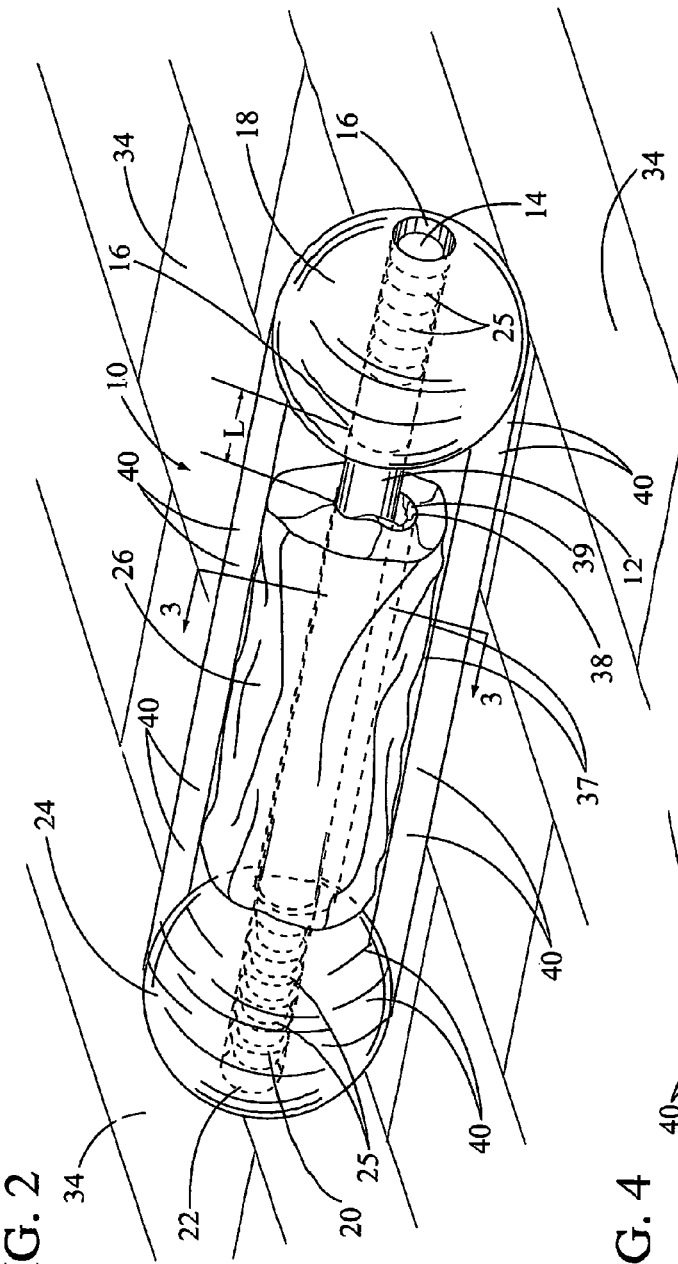
FIG. 2 illustrates another perspective view of the dog bone carrier and illustrating the dog bone carrier with elongated shaft having opposite ends attached to first and second end piece balls. The chewing space and the non-contact zone are shown in diagonal lines on the carrier. This space allows the pet room to chew on the desirable ends of the bone, or search for a treat placed into a hollow cavity of the bone.

In FIG. 1, a perspective view of the subject dog bone carrier is shown having a general reference numeral 10. The carrier 10 broadly includes an elongated shaft 12 having a first end portion 14 received inside a first hole 16 in a flexible, first end piece ball 18. In FIG. 2, a second end portion 20 of the shaft 12 is shown received inside a second hole 22 in a flexible, second end piece ball 24. The second end portion 20 and the second hole 22 are shown in FIG. 2.

The first and second end portions 14 and 20 of the shaft 12 can be secured inside the holes in a press fit. Also the end portions can include ribs 25, shown in dashed lines in FIG. 2, or threads thereon for helping secure the shaft 12 to the balls 18 and 24. It is anticipated that the opposite ends of the shaft can be attached to the two balls in a variety of ways. Also, the holes 16 and 22 can extend partially or through the diameter of the balls for allowing the shaft 12 to have an adjustable length between the two balls.

When one of the balls is removed from the shaft 12, the shaft is used for receiving various lengths of a hollow dog bone 26. While the dog bone 26 is shown in the drawings and discussed herein, it should be kept in mind the dog bone 26 can be a natural cow bone, an artificially made dog bone, a chew piece or raw hide wrap and the like received around the shaft.

In FIG. 1 a large dog 28 is shown with his or her paws 30 holding the second ball 24, with the dog's mouth 32 chewing on the side of one end of the dog bone 26. It should be noted that the flexible balls 18 and 24 help provide for a better grip by the dog's paws 30, when the subject carrier 10 is in use.

In FIG. 2, the dog bone carrier 10 is shown received on top of a surface 34. As mentioned above, the surface 34 can be a hardwood or tile floor, a rug surface, a carpet, a piece of furniture, and an outdoor ground surface and or other areas inhabited by a dog. While the balls 18 and 24 are shown annular in shape, they can have various geometric configurations and without departing from the spirit and scope of the invention. The balls 18 and 24 can be made of various types of flexible material, such as material having a Shore A durometer in the range of 30-95. The flexible material feature minimizes the scarring of the surface 34, when the carrier 10 is dropped or rolls on the surface.

In this drawing, the hollow dog bone 26 is shown moved on the shaft 12 from right to left for creating a chewing space, shown as diagonal lines 36. The length of the dog bone 26 can vary from 2 to 10 inches. The bone 26 has a hard exterior surface 37. The length of the shaft 12 can vary from 6 to 12 inches and greater. It should be noted from observing dogs that enjoy chewing on dog bones, they typically prefer to chew on the side of one end of the bone rather than along the length of the bone.

A dog treat made of various edible food products 38 can be inserted between an end portion of the interior diameter of the hollow bone and the diameter of the shaft. The difference between the interior diameter of the bone and the diameter of the shaft creates a dog treat space 39. With the treat space 39, the dog can use his or her tongue to find the dog treat 38 therein for added enjoyment when using the carrier 10. Also, the dog can enjoy the carrier 10 by sliding the bone 26 back and forth on the shaft 12 for play and chewing on opposite ends of the bone. The carrier itself adds to the amusement by rolling on the floor or other surfaces.

A length "L" of the chewing space 36, between one end of the dog bone 26 and either the first ball 18 or second ball 24, can be in a range of 1 to 6 inches and greater for providing sufficient space for the dog's mouth 32 to be received therein and for engaging and chewing on the side of the end of the bone.

Figure 3:
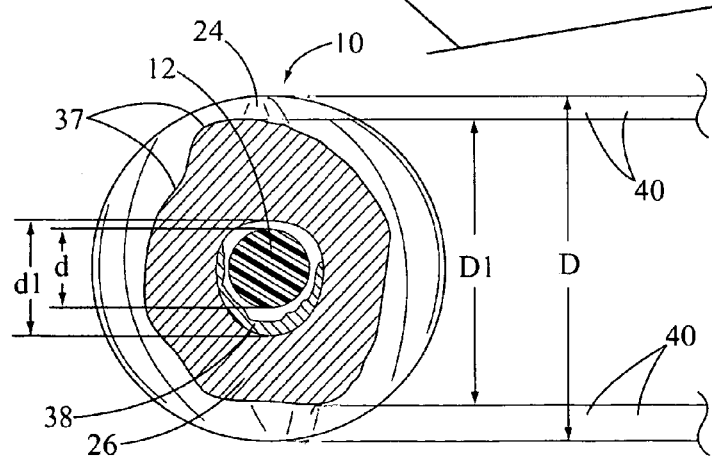
FIG. 3 is a cross-sectional view of the dog bone carrier taken along lines 3-3, shown in FIG. 2.

In FIG. 3, a cross-sectional view of the carrier 10 is shown and taken along lines 3-3 in FIG. 2. In this drawing, the shaft 12 is shown having a diameter "d", which is in a range of ½ to ¾ inches. The interior diameter of the dog bone 26 is "d1", which is greater than the diameter "d", allows the dog bone 26 to slide along the length of the shaft. The interior diameter "d1" of the dog bone is in a range of ¾ to 2¾ inches.

Also, in this drawing, the second ball 24, which is the same size as the first ball 18, has a diameter "D", in a range of 4 to 6 inches. The exterior diameter or overall width of the dog bone 26 is "D1", and is in a range of 2 to 3½ inches. With the diameter "D" always being greater then the diameter "D1", a non-contact zone is created. The non-contact zone is shown as diagonal lines 40 in this drawing and FIGS. 2 and 4. Thus, the non-contact zone 40, shown in FIGS. 2 and 4, disposed around the length of the shaft 12, prevents contact of the surface 34 by the hard exterior surface 37 of the dog bone 26.

Figure 4:
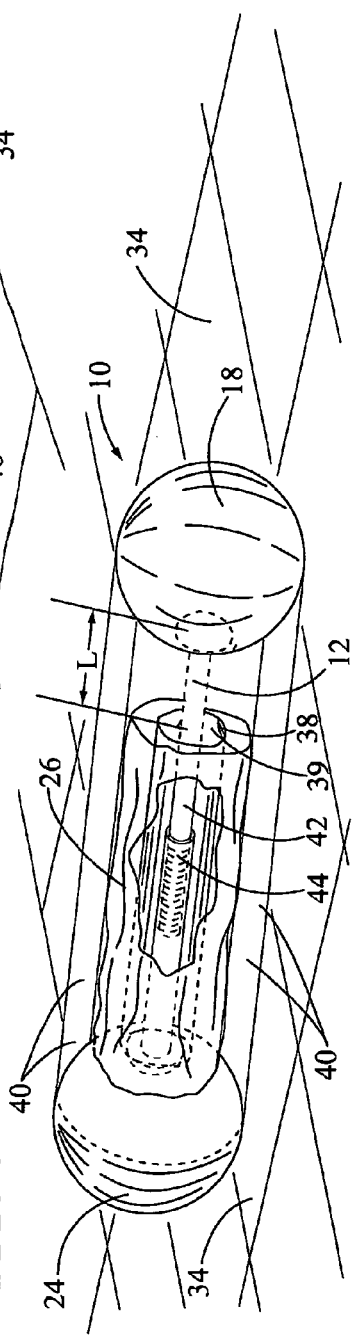
FIG. 4 is a perspective with of an alternate embodiment of the dog bone carrier having a two-piece shaft with adjustable length and attached to the two end piece balls.

In FIG. 4, a perspective view of an alternate embodiment of the dog bone carrier 10 is shown. In this drawing, the shaft 12, having opposite ends attached to the two balls 18 and 24, is a two-piece shaft having a threaded male end portion 42 for receipt inside a threaded female end portion 44. By threading the male end portion 42 inside the female threaded end portion 44, the length of the shaft 12 can be adjusted for creating different lengths 'L" of the chewing space 36 for different size dogs.

While different dimensions and diameters of the carrier 10 are discussed above for the length and diameter of the shaft, the length, diameter or width of the dog bone and diameter of the end piece balls, it should be kept in mind that these dimensions can vary depending on size of the dog and the animal's use of the subject dog bone carrier 10.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which an exclusive privilege and property right is claimed are defined as follows:

1. A hollow bone carrier, the carrier used by a dog and other animals for play and chewing, the carrier comprising:
   an elongated rigid shaft, the shaft having a first end portion and a second end portion;
   a first flexible end piece ball, the first end portion of the shaft attached to the first ball;
   a second flexible end piece ball, the second end portion of the shaft attached to the second ball; and
   a hollow bone, the bone having an interior diameter and an exterior diameter or width, the shaft received through the interior diameter of the bone, the interior diameter of the bone greater than a diameter of the shaft, the difference in the interior diameter of the bone and the diameter of the shaft allowing the bone to slide along a length of the shaft and between the first and second balls, the exterior diameter or width of the bone having less than a diameter of each of the first and second balls;
   whereby, the difference between the diameters of the first and second balls and the exterior diameter or width of the bone provides a non-contact zone which prevents contact by an exterior surface of the bone on a surface when the carrier is dropped and rolled horizontally on the surface.

2. The carrier as described in claim 1 wherein the shaft has a length greater than a length of the bone for proving a chewing space, the chewing space having a length "L", the chewing space disposed between one end of the dog bone and either the first ball or the second ball, the chewing space adapted for allowing the dog or other animal to engage a side of the one end of the bone with his or her mouth.

3. The carrier as described in claim 1 wherein a difference between the diameter of the shaft and the interior diameter of the bone creates a treat space, the treat space adapted for receiving an animal treat therein.

4. The carrier as described in claim 2 wherein the length "L" of the chewing space between the end of the bone and either the first ball or the second ball is in a range of 1 to 6 inches, the elongated shaft has a length in a range of 6 to 12 inches, and a diameter in a range of ½ to ¾ inches.

5. The carrier as described in claim 1 wherein each of the flexible first and second balls have a Shore A durometer in a range of 30 to 95 to prevent scarring of the surface when the carrier is dropped and rolled thereon.

* * * * *